US005398561A

United States Patent [19]

Tamura

[11] Patent Number: 5,398,561

[45] Date of Patent: Mar. 21, 1995

[54] HARNESS PRODUCING APPARATUS

[75] Inventor: Yoshikazu Tamura, Ishikawa, Japan

[73] Assignee: Sumitomo Wiring Systems, Ltd., Mie, Japan

[21] Appl. No.: 139,041

[22] Filed: Oct. 21, 1993

[30] Foreign Application Priority Data

Oct. 21, 1992 [JP] Japan .................................. 4-308229

[51] Int. Cl.[6] .............................................. G01N 19/00

[52] U.S. Cl. ....................................... 73/865.9; 29/593

[58] Field of Search .......... 73/865.9; 29/593, 857–867

[56] References Cited

U.S. PATENT DOCUMENTS 4,110,880 9/1978 Peppler et al. ........................ 29/593

*Primary Examiner*—Robert Raevis

*Attorney, Agent, or Firm*—Sughrue, Mion, Zinn, Macpeak & Seas

[57] ABSTRACT

This invention aims to prevent an apparatus from producing faulty goods even if a decision on cable kind is subject to human error. A harness producing apparatus is provided with controlling means which detect a cable diameter, a sheath hardness, and a wire state of a sheathed cable 50 to be actually worked, determine a cable kind of the sheathed cable 50 to be actually worked in accordance with detected data, decide whether or not the actual cable kind is the same as an input cable kind of a sheathed cable recorded before starting the apparatus, and stop the apparatus if they are not the same. Since the apparatus is stopped even if a sheathed cable 50 is set by mistake due to a human error, the sheathed cable 50 is not worked as it is erroneous, thereby preventing production of an inferior harness and thus generation of faulty goods.

1 Claim, 12 Drawing Sheets

| CABLE DIAMETER D | CABLE KIND T |
|---|---|
| $D_1$ | $T_{11}$, $T_{12}$, $T_{13}$ |
| $D_2$ | $T_{21}$, $T_{22}$ |
| $D_3$ | $T_{31}$ |
| ⋮ | ⋮ |
| $D_n$ | $T_{n1}$, $T_{n2}$, ··· $T_{nn}$ |

Fig. 11

| SHEATH HARDNESS | CABLE KIND T |
|---|---|
| $H_1$ | $T_{11}$, $T_{13}$, $T_{14}$ |
| $H_2$ | $T_{21}$, $T_{23}$ |
| $H_3$ | $T_{32}$ |
| ⋮ | ⋮ |

Fig. 12

| WIRE STATE M | CABLE KIND T |
|---|---|
| $M_1$ | $T_{11}$, $T_{14}$, $T_{15}$ |
| $M_2$ | $T_{22}$, $T_{23}$ |
| $M_3$ | $T_{33}$ |
| ⋮ | ⋮ |

HARNESS PRODUCING APPARATUS

BACKGROUND OF THE INVENTION

1. Field of the Invention

This invention relates to an apparatus for producing a harness.

2. Statement of the Prior Art

For convenience of explanation a prior harness producing apparatus will be explained below by referring to FIGS. 19 and 20.

FIGS. 19 and 20 are schematic side views of a prior harness producing apparatus, which includes a cable feeding mechanism 10, a pair of drawing rollers 11, a front side clamp 12, a cutter unit 18, and a rear side clamp 14.

Since it is necessary to produce various kinds of harness according to use, an operator must select a sheathed cable 30 corresponding to a harness to be produced out of a plurality of kinds of sheathed cable in accordance with an indicating card; set the selected sheathed cable 80 in tile harness producing apparatus; and input data on the selected cable through an input means or the like to the apparatus.

When an operation start signal is applied to the apparatus, the apparatus carries out a working process of the set sheathed cable 80 in accordance with the input cable kind. That is, first both clamps 12 and 14 hold the sheathed cable 30 and the cutter unit 18 operates in synchronization with the clamps 12 and 14. Then a middle cutter 13*a* in the cutter unit 13 cuts off the sheathed cable 30 and opposite side cutters 18*b* cut into sheaths of the cut-off cables. While maintaining this state, the front side clamp 12 moves in a direction shown by an arrow Q so that the sheathed cable 30 held by the clamp 12 (hereinafter referred to as "residual cable" 30) moves in the direction Q, thereby stripping the sheath from an end of the residual cable 30. At the same time, the rear side clamp 14 moves in a direction shown by an arrow P so that the sheathed cable 30 held by the clamp 14 (hereinafter referred to as "cut cable" 30) is stripped of its sheath at one end.

Then, the residual cable 30 together with the front side clamp 12 move to the paper surface of FIG. 19, a terminal 31 is press-attached to a stripped end of the residual cable 30 by a terminal-pressing machine (not shown), and the front side clamp 12 returns to its original position.

On the other hand, the cut cable 30 together with the rear side clamp 14 moves to the paper surface of FIG. 19, a terminal (not shown) is press-attached-to a stripped end of the cut cable 30 by a terminal-pressing machine (not shown), the cut cable 30 is discharged to a given discharging position, and the clamp 14 returns to the original position.

After the clamps 12 and 14 release the cable, a measuring roller i rotates so that the sheathed cable 30 is fed to the drawing rollers 11. At a little time lag after feeding the cable, the drawing rollers rotate so that the sheathed cable 30 is fed to the rear side clamp 14.

Thereafter, the above steps are repeated to produce the cut cable (harness) which is provided with the terminals 31 on the opposite stripped ends thereof.

The sheathed cable 30 to be worked by such harness producing apparatus has a different wire state such as a sheath hardness, a sheath thickness, a wire diameter, a wire density and the like as well as a cable diameter, dependent on a cable kind. Accordingly, an operator must select a suitable cable kind of a sheathed cable 30 out of a plurality of cable kinds of the sheathed cables 30. Heretofore, the operator has selected the sheathed cable by a visual decision in accordance with a cable kind distinctive mark given on an outer face of the sheathed cable 30. If a selection of the cable kind is mistaken by a human error, the erroneous cable kind of the sheathed cable is worked by the harness producing apparatus and thus an inferior harness different from a desired cable kind in cable diameter, sheath hardness, and wire state is produced. The inferior harness is forwarded as it is thus resulting in the manufacture of faulty goods. In particular, it is difficult to surely eliminate human error since it occurs sporadically. It has been desired to provide a permanent measure to counter such human error.

SUMMARY OF THE INVENTION

An object of the present invention is to provide a harness producing apparatus which can prevent a production of faulty goods even if the human error happens to occur in selection of a cable kind.

In order to achieve the above object, a harness producing apparatus which works a sheathed cable to form a harness, in accordance with the present invention, comprises means for inputting data as to cable kinds of sheathed cables to be worked; a first means for detecting a cable diameter of an actual sheathed cable to be worked; a second means having a sensor adapted to contact with and separate from said actual sheathed cable and for detecting a sheath hardness of said actual sheathed cable in accordance with a compressed value of a sheath of said actual sheathed cable caused upon contacting the sensor with said sheath; a third means for detecting a wire state of said actual sheathed cable by utilizing an electromagnetic induction caused in a wire or wires by applying a given magnetic field to said actual sheathed cable; memory means for recording information as to mutual relationships between said cable kinds and said cable diameter, sheath hardness, and wire state; and control means for determining a cable kind of said actual sheathed cable by comparing said detected cable diameter, sheath hardness, and wire state and said recorded information from said memory means, for deciding whether the cables are of the same kind or not by comparing said determined actual cable kind and said input cable kind, and for generating an indicating signal such as electrical current, sound, vibration, light when said cables are either of the same kind or not of the same kind.

According to the harness producing apparatus of the present invention, since it is decided whether the actual sheathed cable to be worked in the apparatus is the same as the input sheathed cable or not and an indication is given in the case of disaccord, an operator can recognize a selection error by the indication even if a sheathed cable of a mistaken cable is erroneously set in the apparatus, thus preventing the cable from being worked as it is and avoiding the production of an inferior harness and faulty goods. In the harness producing apparatus, the actual kind of sheathed cable to be worked is judged by determining the cable diameter, sheath hardness, and wire state.

A harness to which the present invention is applied can be used in an automobile, an electrical device or the like. The harness has a construction in which an insulation sheath is covered on a single or a plurality of wires (twisted wires in many cases).

A "cable kind" of a sheathed cable in the prevent invention gives a generic term of distinguishing the respective cable such as cable diameter, sheath material, sheath hardness, a wire state and the like. The wire state means the number of wires, material thereof, diameter of wires, joining of the wire ends and the like.

BRIEF DESCRIPTION OF THE DRAWINGS

FIG. 11 is an explanatory view showing a mutual relationship between a sheath hardness and the cable kind;

FIG. 12 is an explanatory view showing a mutual relationship between a wire state and the cable kind;

DETAILED DESCRIPTION OF THE PREFERRED EMBODIMENTS

Referring now to FIGS. 1 to 18, an embodiment of a harness producing apparatus of the present invention will be described below.

Figure 1:
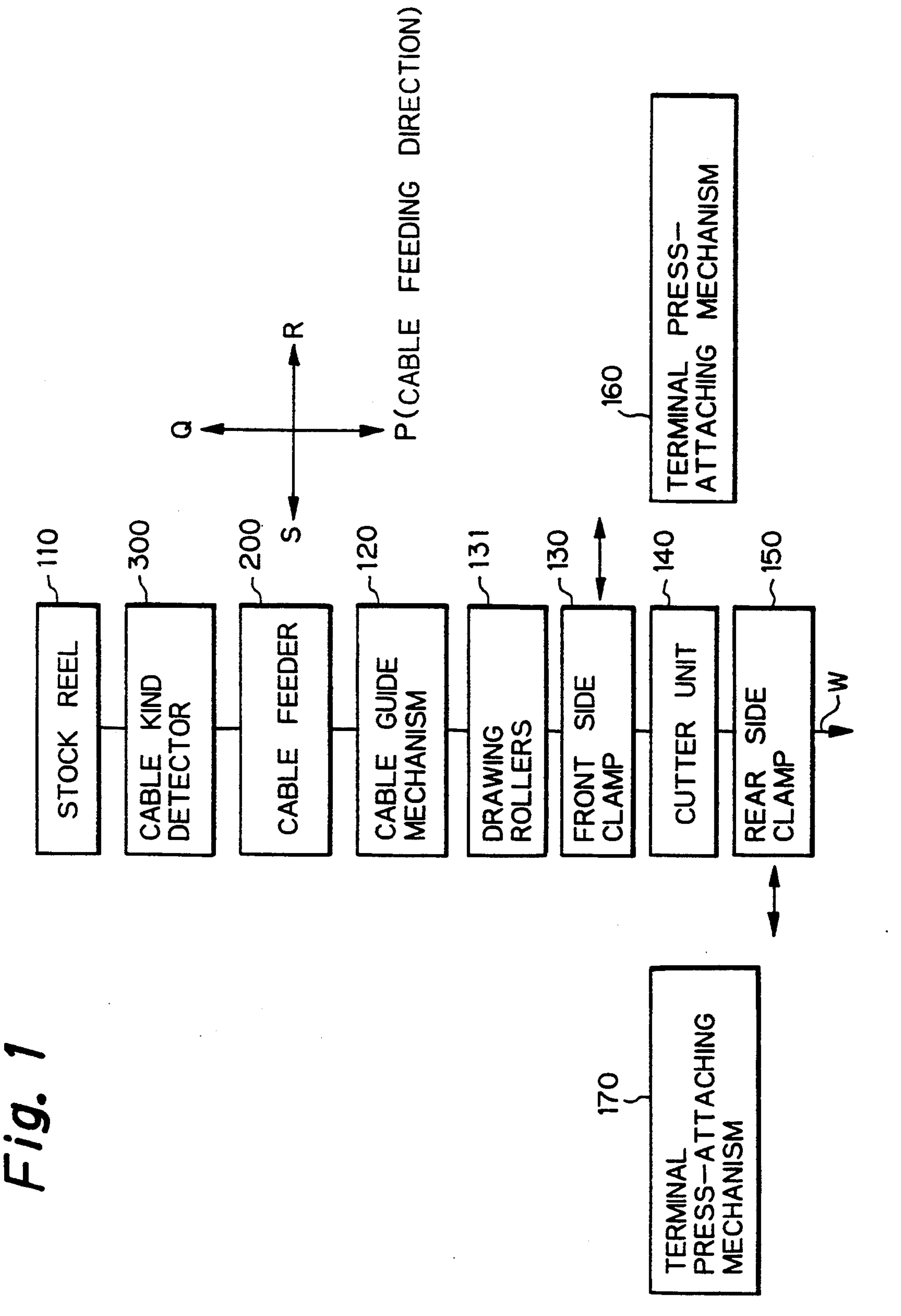
FIG. 1 is a schematic plan view of an embodiment of a harness producing apparatus of the present invention.
Figure 2:
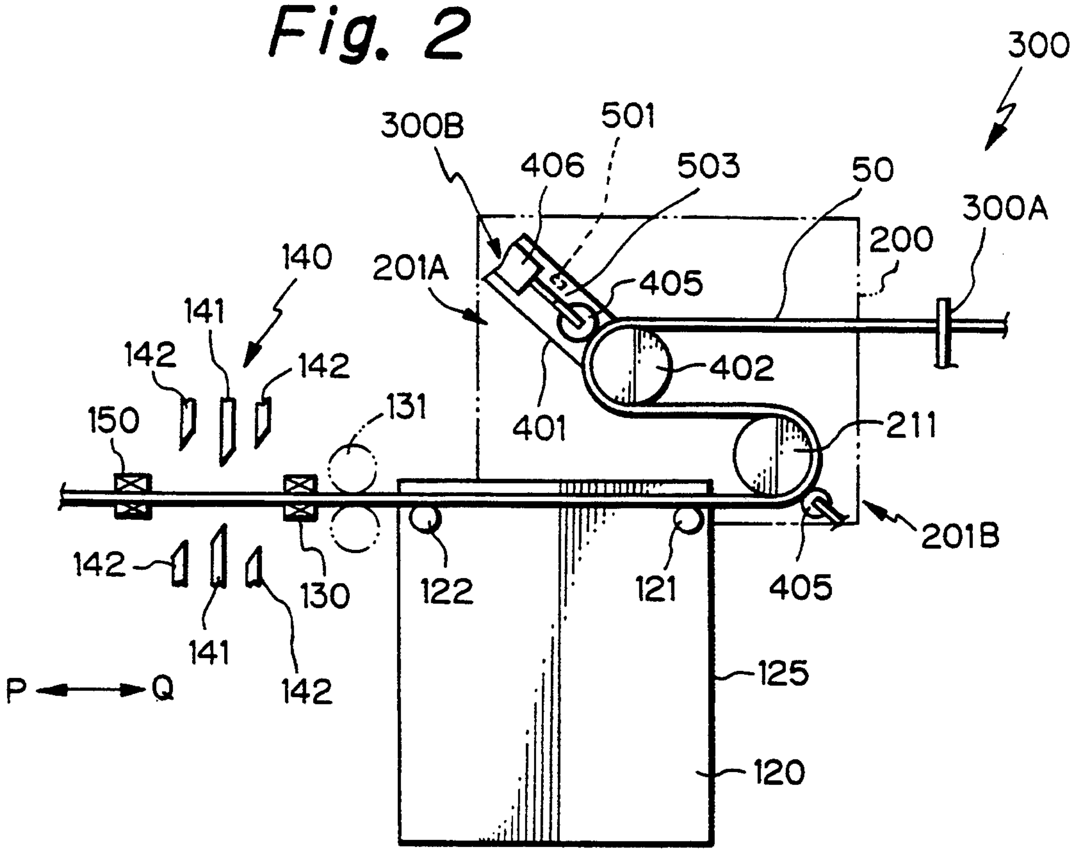
FIG. 2 is a schematic side view of FIG. 1 illustrating a step of working a sheathed cable.
Figure 3:
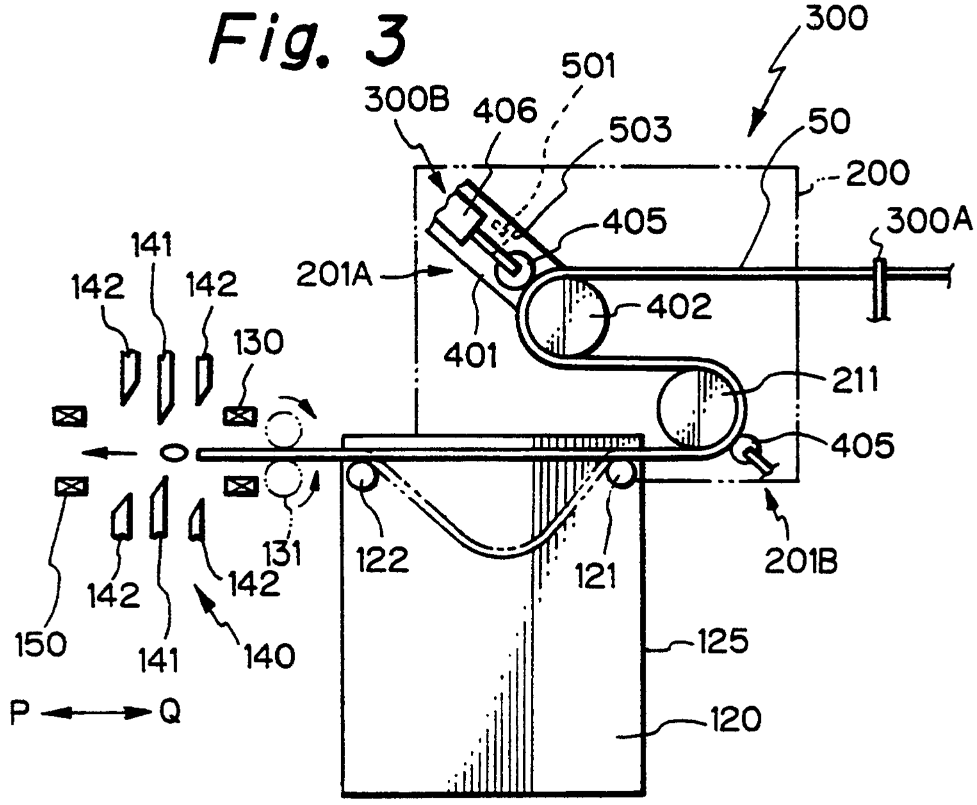
FIG. 3 is a schematic side view of FIG. 1 illustrating another step.
Figure 7:
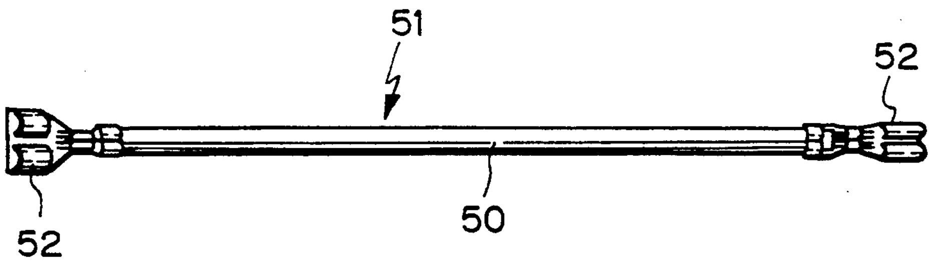
FIG. 7 is a plan view of a harness produced by the embodiment of the harness producing apparatus of the present invention.

FIG. 1 is a schematic plan view of an embodiment of the harness producing apparatus of the present invention and FIGS. 2 and 3 are schematic side views of the apparatus. As shown in the drawings, the harness producing apparatus comprises along a cable pass line W a stock reel 110, a cable kind detector 300, a cable feeder 200, a cable guide mechanism 120, a pair of drawing rollers 131, a front side clamp 130, a cutter unit 140, and a rear side clamp 150. Terminal-pressing mechanisms 160 and 170 are provided on the opposite sides of the cutter unit 140. A sheathed cable 50 is intermittently fed by the cable feeder 200 and worked by various steps described hereinafter so that a harness having terminals on the opposite ends thereof shown in FIG. 7 is successively produced.

Figure 4:
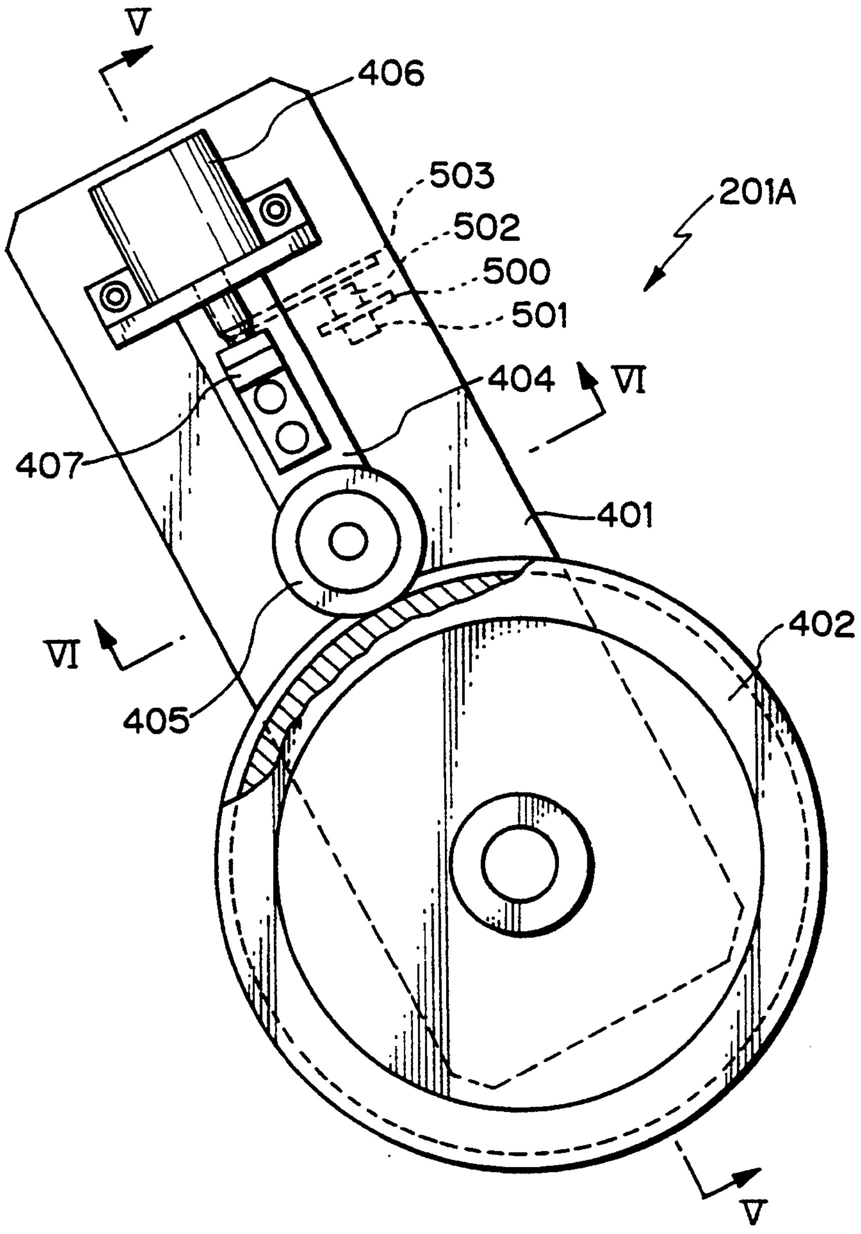
FIG. 4 is an enlarged side view of a main part of a cable feeder to be utilized in the embodiment of the present invention.
Figure 5:
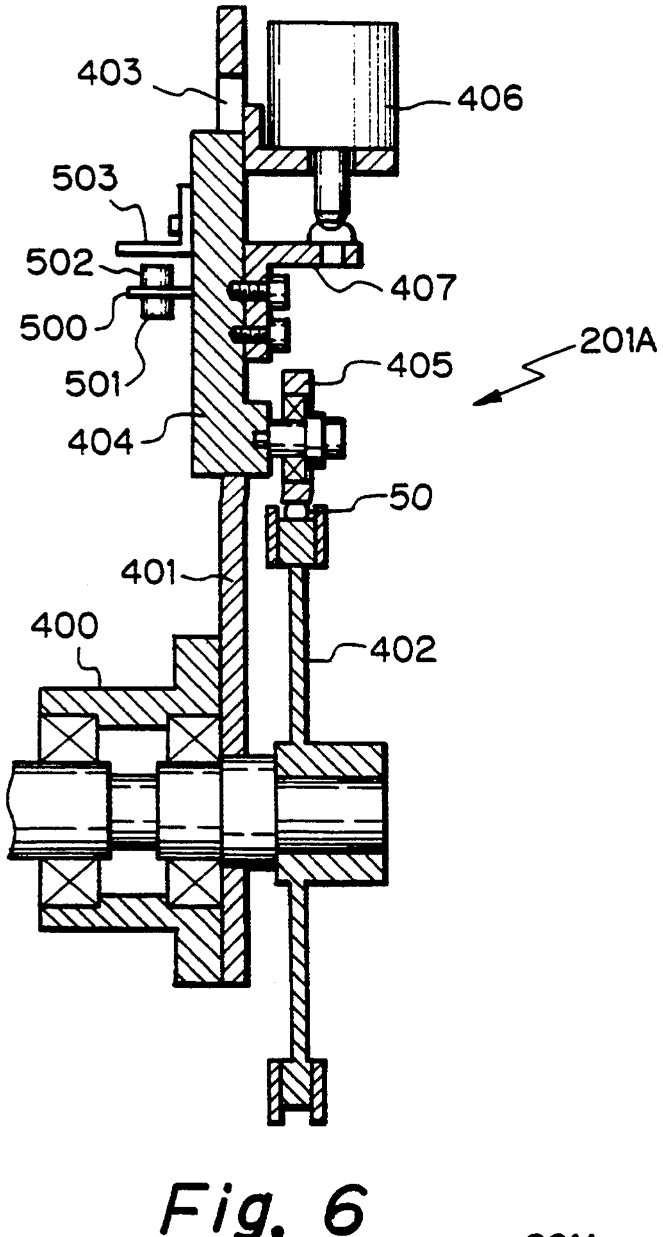
FIG. 5 is a longitudinal cross sectional view taken along lines V—V in FIG. 4.
Figure 6:
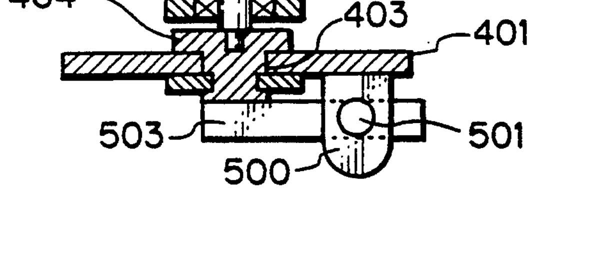
FIG. 6 is a lateral cross sectional view taken along lines VI—VI in FIG. 4.

FIG. 4 is an enlarged side view of the wire feeder 200, FIG. 5 is a longitudinal cross sectional view taken along lines V—V in FIG. 4, and FIG. 6 is a lateral cross sectional view taken along lines VI—VI in FIG. 4. As shown in FIGS. 2 to 6, the wire feeder 200 has a measuring part 201A and a feeding part 201B. In the measuring part 201A, a base plate 401 is secured to a body 400 of the wire feeder 200 and a measuring roller 402 is rotatably supported on the body 400 through the base plate 401.

The base plate 401 is provided with a slit 403 along a radial direction of the measuring roller 402. A slider 404 is inserted in the slit 403 slidably along the longitudinal direction. A cylinder body of an air cylinder 406 is secured to the base plate 401 and an end of a piston rod of the air cylinder 406 is secured through a bracket 407 to the slider 404. Further, a pinch roller 405 is rotatably attached to the slider 404. When the slider 404 slides in the slit forwardly or backwardly by an actuation of the air cylinder 406, the pinch roller 405 contacts with or separates from the measuring roller 402. On the other hand, the feeding part 201B (FIGS. 2 and 3) is the same as the measuring part 201A except that a feeding roller 211 is provided in place of the measuring roller 402. A pinch roller 405 contacts with and separate from the feeding roller 211.

The measuring roller 402 and feeding roller 211 are driven into the same rotary direction in synchronization with each other by a driving means described hereinafter. While the pinch rollers 405 push the sheathed cable 50 on the measuring roller 402 and feeding roller 211 by the air cylinder 406, the sheathed cable 50 passes around the measuring roller 402 and feeding roller 211 in an S like path. When the measuring roller 402 and feeding roller 211 are rotated by the driving means, the sheathed cable 50 is fed in a direction shown by an arrow P along the longitudinal direction (hereinafter referred to as "cable feeding direction P") by a distance corresponding to the number of revolution.

As shown in FIGS. 4 to 6, a sensor head 502 of an eddy current type displacement sensor 501 is secured through a sensor mounting plate 500 to the rear side of the base plate 401 of the measuring part 201A. A metal target 503 is secured to the slider 404 in opposition to the sensor head 502. The target 503 moves to or away from the sensor head 502 in response to a forward or backward movement of the pinch roller 405 with respect to the measuring roller 402 and thus a signal corresponding to a gap between the pinch roller 405 and the measuring roller 402 is applied to a control means 600 described hereinafter. The eddy current type displacement sensor 501 constitutes a cable diameter and hardness detector 300B in the cable kind detector 300 as means for a cable diameter and a sheath hardness of the sheathed cable 50.

Figure 8:
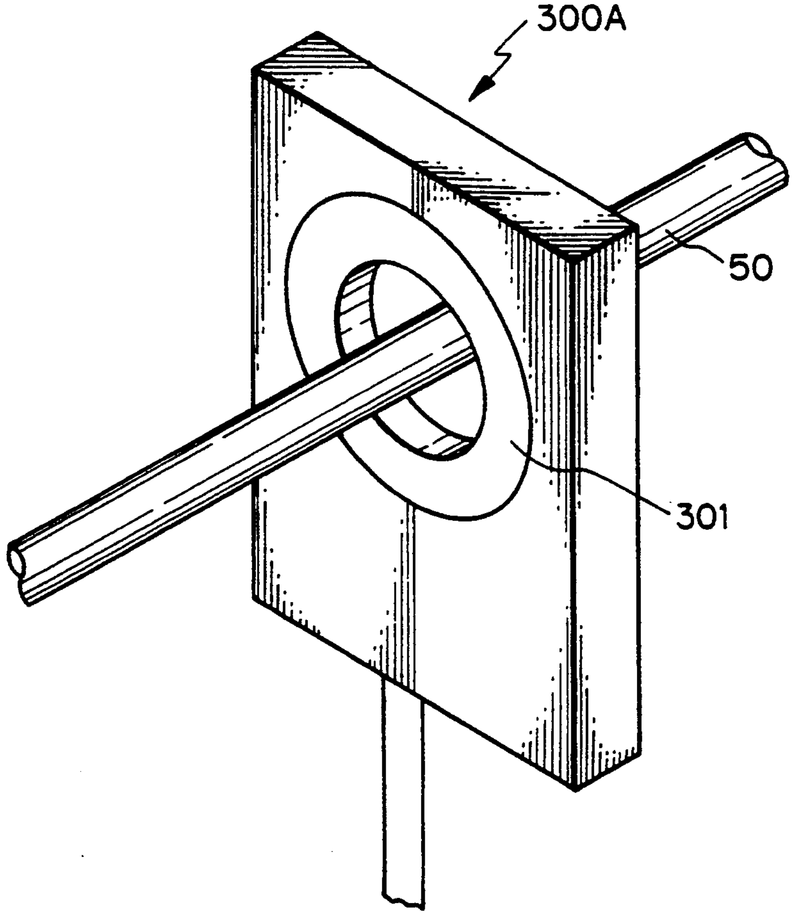
FIG. 8 is a perspective view of a cable state detector to be utilized in the embodiment.

As shown in FIGS. 1 to 3, a wire state detector 300A containing an eddy current type sensor such as a joint detector or the like as the cable kind detector 300 is provided on an upper stream with respect to the cable feeding direction of the cable feeder 200. As shown in FIG. 8, the wire state detector 300A is provided with a ring like sensor head 301, into a ring hole of which the sheathed cable 50 is inserted. In the wire state detector 300A, when the sensor head 301 generates a high frequency magnetic field by flowing a current in a coil in the sensor head 301 from an oscillation circuit (not shown) with the sheathed cable 50 being passed through the sensor head 301, an eddy current flows in a wire or wires of the sheathed cable 50 by an electromagnetic induction, so that a loss of the eddy current causes and an oscillation level of the oscillation circuit becomes lower. It is possible to detect the wire state of the sheathed cable 50 by detecting this level change.

As shown in FIGS. 2 and 3, two spaced guide rollers 121 and 122 are rotatably attached to an upper end of a body 125 of the cable guide mechanism 120. While the sheathed cable 50 fed from the cable feeder 200 is loosened between the guide rollers 121 and 122, the sheathed cable 50 waits for driving until it is fed by drawing rollers 131 described below.

A pair of drawing rollers 131 serves to clamp the sheathed cable 50 on the cable pass line W so that the sheathed cable 50 is fed along the cable feeding direction P when the drawing rollers 131 rotates.

The front side clamp 130 serves to clamp and release the sheathed cable 50 on the cable pass line W and can be moved in a horizontal plane including the cable pass line W by the driving means.

The cutter unit 140 includes a pair of cutters 141 which cut off the sheathed cable 50 on the cable pass line W and two pairs of cutters 142 which are disposed on the opposite sides of the cutters 141 and cut into a sheath of the cable 50. Further, each pair of cutters 141 and 142 in the cutter unit 140 open and close in synchronization with each other.

The rear side clamp 150 serves to clamp and release the cable 50 on the cable pass line W and can be moved in a horizontal plane including the cable pass line W by the driving means.

Figures 9, 10:
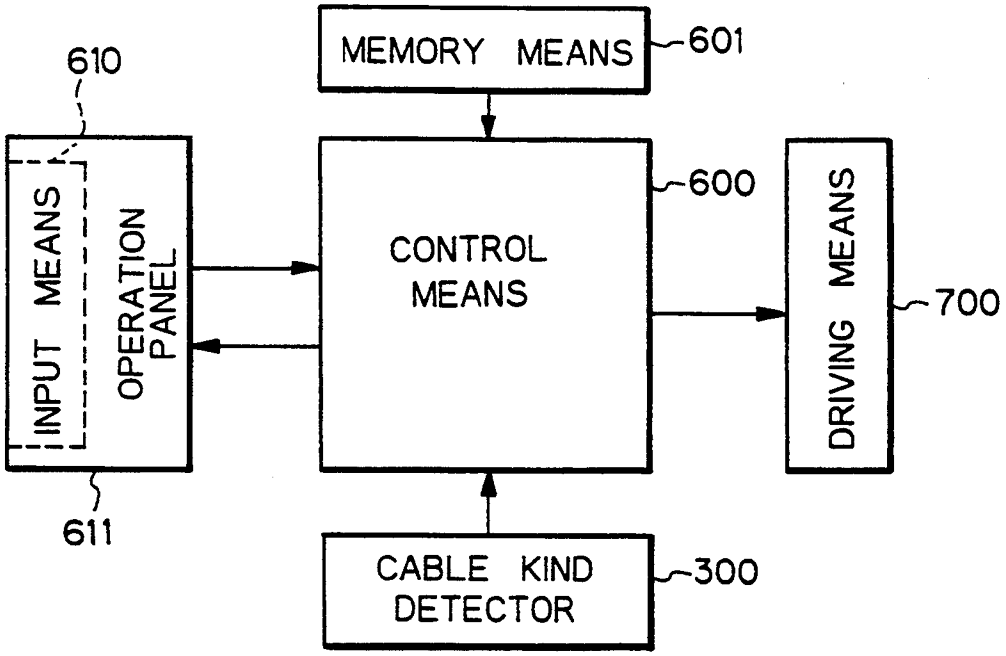
FIG. 9 is an explanatory view of a control system of the harness producing apparatus.
FIG. 10 is an explanatory view showing a mutual relationship between a cable diameter and a cable kind.

As shown in FIG. 9, the harness producing apparatus includes a control means 600, a memory means 601, an operation panel 611 and a driving means 700. The eddy current type displacement sensor 501 and a cable kind detector 300 including the cable diameter and hardness detector 300B and wire state detector 300A are connected to the control means 600. The operation panel 611 is provided with an input means 610 through which an operator can input information described hereinafter and operation start command to the control means 600. The driving means 700 includes a plurality of motors and the like which drive individually the measuring roller 402, feeding roller 211, drawing rollers 131, clamps 130 and 150, cutter unit 140, and terminal-pressing mechanisms 160 and 170. In the harness producing apparatus, the control means 600 controls the driving means 700 in response to input information and command.

Information concerning the mutual relationships between the cable diameter and the cable kind of the sheathed cable, between the sheath hardness and the cable kind of the sheathed cable, and between the wire state and the cable kind of the sheathed cable are recorded in the memory means 601. For example, as shown in FIG. 10, the sheathed cable 50 with a diameter of D1 has three cable kinds; D2 in diameter has two cable kinds $T_{21}$ and $T_{22}$; D3 in diameter has one cable kind $T_{31}$ and $D_n$ in diameter has n cable kinds $T_{n1}$, $T_{n2}$ . . . $T_{nn}$. Such mutual relationships between the cable diameter and the cable kind are recorded in the memory means in a form of data. Similarly, as shown in FIGS. 11 and 12, the mutual relationships between the sheath hardness H (H1, H2, H3, . . . ) and the cable kind T ($T_{11}$, $T_{13}$ . . . ) of the sheathed cable and between the wire state M (M1, M2, M3, . . . ) and the cable kind T ($T_{11}$, $T_{14}$, $T_{15}$ . . . ) are recorded in the memory means 601 in a form of data.

Next, an operation of the harness producing apparatus will be explained by referring to a flow chart shown in FIG. 13.

In the case of setting the sheathed cable 50 in the apparatus prior to starting an operation, the operator selects a sheathed cable to be worked out of a plurality of kinds of sheathed cables 50 in accordance with an indicative card, draws the sheathed cable 50 from the stock reel 110, passes the cable 50 through the sensor head 301 of the wire state detector 300A, and winds it around the measuring roller 402 and feeding roller 211 in an S like path. Further, after passing the sheathed cable 50 on the guide rollers 121 and 122 of the cable guide mechanism 120, the cable 50 is passed through a pair of drawing rollers 131, the front side clamp 130, cutter unit 140 and rear side clamp 150.

Then, the operator inputs information concerning a length of the cable 50 to be cut, a length of a sheath of the cable to be stripped and the like as well as a cable kind of the cable through the input means 610 in the control means 600 in accordance with the indicative card.

In this state, when an operation starting command is applied through the input means 610 to the control means 600, a working process according to the input information is effected to the sheathed cable 50. That is, the air cylinder 406 is driven forwardly, so that the sheathed cable 50 is clamped between the pinch roller 405 and the measuring roller 402 and between the pinch roller 405 and the feeding roller 211.

Figure 13:
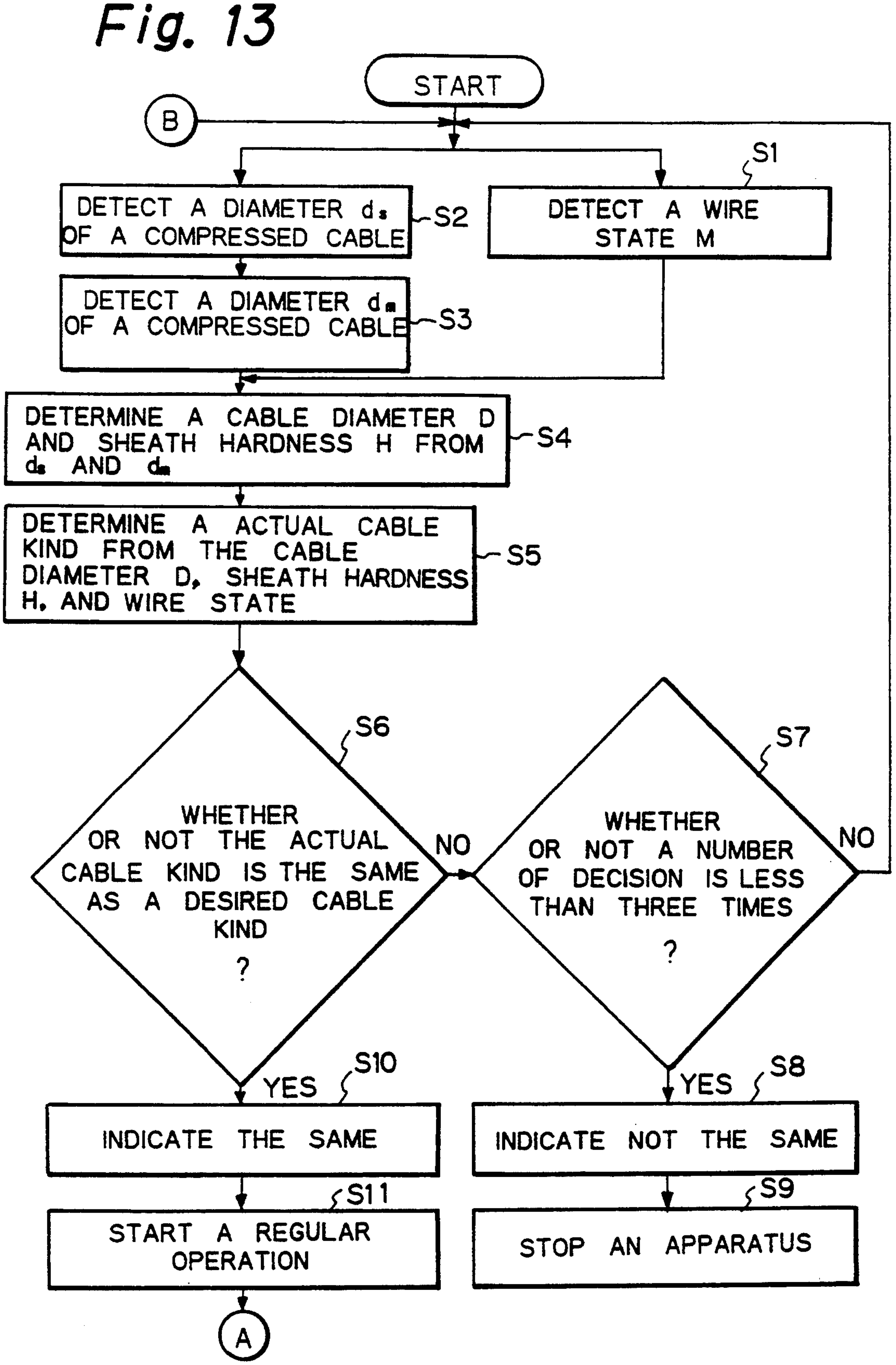
FIG. 13 is a flow chart illustrating an operation of the harness producing apparatus.

Then, as shown in a step S1 in FIG. 13, a wire state M of a wire or wires in the sheathed cable 50 is detected in accordance with an output from the wire state detector 300A.

On the other hand, as shown in a step S2, a gap (a diameter of a compressed cable) ds between the pinch roller 405 and the measuring roller 402 (FIG. 15) is detected in accordance with an output signal from the sensor 501 of the cable diameter and hardness detector 300B. Then, the sheathed cable 50 is fed by a given distance (a length of a wire harness of an input cable kind) by rotation of the measuring roller 402 and feeding roller 211. As shown in a step S3, a gap (a diameter of a compressed cable) dm between the pinch roller 405 and the measuring roller 402 (FIG. 16) during feeding the cable is detected. In this case, the diameter dm during feeding the cable is larger than the diameter ds during stopping the cable.

Next, as shown in a step S4, the cable diameter D and sheath hardness H of the sheathed cable 50 are determined from the diameters ds and dm in accordance with the following experimental equations (1) and (2):

$$D=dm+a \tag{1}$$

$$H=(dm-ds)/dm \tag{2}$$

here, a is a constant obtained from experimental data.

As shown in a step S5, an actual cable kind of a sheathed cable to be worked is determined from the wire state M, cable diameter D, and sheath hardness H by comparing the M, D and H and information as to the above mutual relationship recorded in the memory means 601. For example, if the wire state is M1, the cable diameter is D1 and the sheath hardness is H1, a cable kind which satisfy the above all conditions is $T_{11}$ as shown in FIGS. 10 to 12.

Then, in a step S6, a detected cable kind ($T_{11}$) of a sheathed cable 50 to be actually worked is compared with an input data of a sheathed cable recorded through the input means 610 and it is decided whether both cable kinds are the same or not (decision process). If they are not the same, the step S6 is shifted to a step S7 and if the number of decision S is less than three times, the steps S1 through S6 are repeated. If the number of decision times is more than three times and both cable kinds are not the same every time, the step S7 is shifted to a step S8. After an indicating signal or the like apparatus on the operation panel 611 that the actual cable kind is not the same as the input cable kind, in a step S9 the harness producing apparatus is stopped (indicating process).

On the other hand, in the step S6, if it is decided that the actual cable kind ($T_{11}$) is the same as the input cable kind, the step S6 is shifted to a step S10 and it is indicated on the operation panel that the actual cable kind is the same as the input cable kind. Then, the step S10 is shifted to a stop S11 and a regular operation starts in accordance with processes of the input cable kind.

Figure 14:
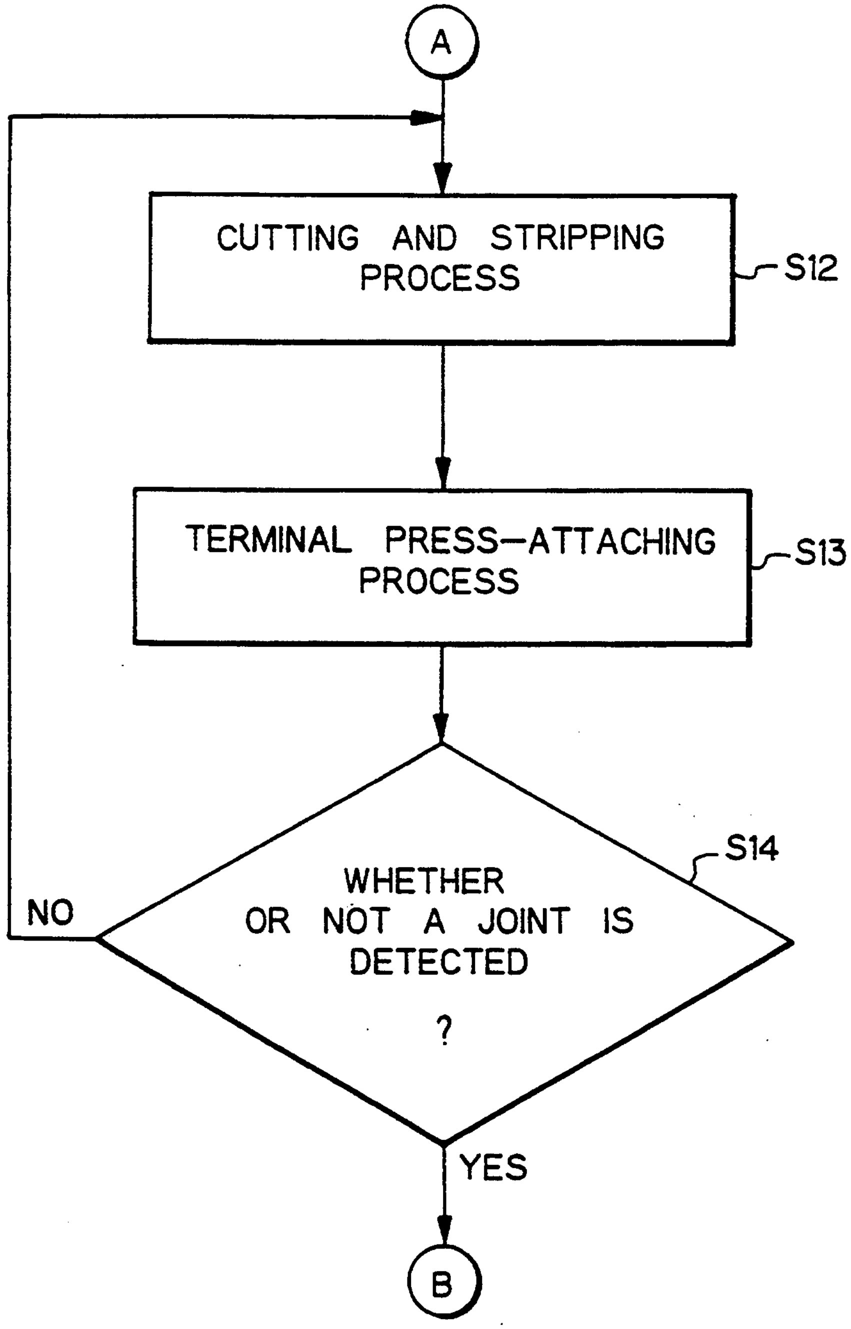
FIG. 14 is a flow chart illustrating an operation of the harness producing apparatus.
Figure 15:
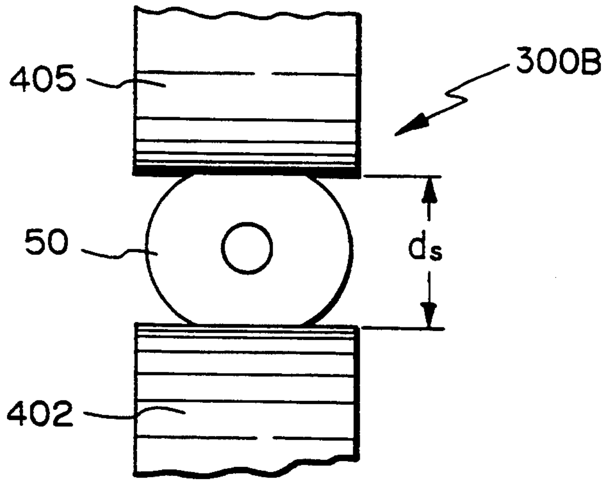
FIG. 15 is an enlarged cross sectional view of a main part of a diameter and hardness detector to be utilized in the harness producing apparatus.
Figure 16:
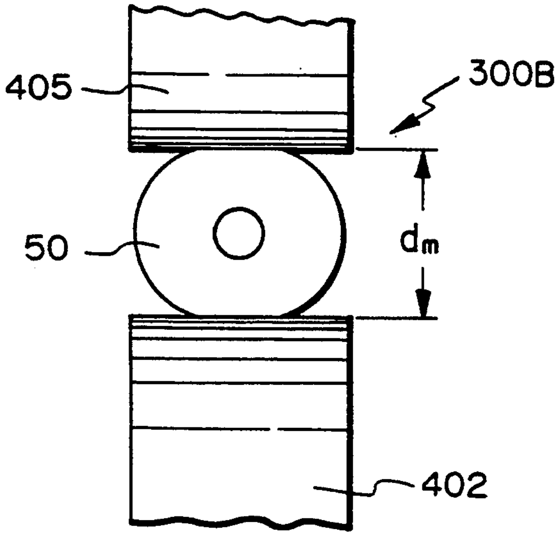
FIG. 16 is a similar view of FIG. 15 but illustrating another position.

When the regular operation starts, as shown in FIG. 14, in a step S12, after the sheathed cable 50 is held by the front and rear side clamps 130 and 150, the cutters 141 and 142 are closed in synchronization with each other so that the cutter 141 cuts off the sheathed cable and the cutters 142 cut into the sheath on the sheathed cable on the opposite sides of the cutting position. Further, the front side clamp 130 moves in a direction opposite to the cable feeding direction P, so that a sheath of the sheathed cable 50 held by the clamp 130 (hereinafter referred to as "residual cable" 50) is stripped from the cable in a lower stream in the cable feeding direction P. In parallel with this process, the rear side clamp 150 moves in the cable feeding direction P, so that a sheath of the sheathed cable 50 held by the clamp 150 (hereinafter referred to as "cut cable" 50) is stripped from the cable in an upper stream in the cable feeding direction P (cutting and stripping process).

In a step S13, the front side clamp 130 holding the residual cable 50 moves toward the terminal pressing mechanism 160 in a direction shown by an arrow R and a terminal 52 is press-attached on the stripped end of the residual cable 50 by the terminal-pressing mechanism 160. Then, the front side clamp 130 moves in a direction S, so that the residual cable 50 is put on the cable pass line W. In parallel with this process, the rear side clamp 150 moves toward the terminal-pressing mechanism 170 in the direction S, so that a terminal 52 is press-attached to the stripped end of the cut cable 50. Then, the rear side clamp 150 releases the cut cable 50 to discharge it at a given position and returns to the original cable pass line W.

In parallel with the step S13, the sheathed cable 50 is fed by the measuring roller 402 and feeding roller 211 to loose the cable 50 between the guide rollers 121 in the cable guide mechanism 120 (FIG. 3). At a little time later after feeding the cable the drawing rollers rotate to feed the cable 50 to the rear side clamp 150 while reducing the loosed path of the cable 50.

The steps S12 and S13 are repeated until a joint is detected in a step 14 (it will be described in detail hereinafter) and the harness 51 having terminals on the opposite ends (FIG. 7) is produced successively.

On the other hand, in the case of producing different kinds of harnesses successively in the harness producing apparatus, a top end of a second sheathed cable to be worked secondly is connected to a bottom end of a first sheathed cable to be worked first so that the different kinds of harnesses are successively produced the harness producing apparatus.

In this case, in a step S14 shown in FIG. 14, since when the joint of the first and second sheathed cables 50 passes through the wire state detector 300A the wire or wires in the joint is changed, it is possible to detect the joint of both sheathed cables by detecting a change in the wire state by the wire state detector 300A. When the joint is detected, the step S14 returns to the steps S1 and S2 shown in FIG. 13 and the steps S1 and S2 are shifted to the steps S3 to S5 after the second sheathed cable is fed by a given distance. Then, it is decided whether or not the actual cable kind of the second sheathed cable is the same as the input cable kind of the second sheathed cable recorded by the input means 610. If they are not the same the harness producing apparatus is stopped while if they are the same it's regular operation starts. Upon starting the regular operation, a cable feeding value of the cable feeder 200 and opening and closing values of the cutter unit 140 are automatically adjusted to correspond to the second sheathed cable in accordance with information recorded in the control means 600 beforehand. Then, the harness is produced by the same manner described above.

Recording information as to a cable kind of a second sheathed cable, a length of the cable to be cut, a length of a sheath of the cable to be stripped and the like in the control means 600 may be effected either immediately after recording information as to the first sheathed cable 50 or during working the first cable 50. In any cases, this recording may be carried out before working the second sheathed cable.

According to the harness producing apparatus described above, the harness is not produced as it is even if the cable kind of the cable 50 is set erroneously by a human error of an operator, since it is decided whether the actual sheathed cable 50 to be worked is the same as the input sheathed cable or not and if it is not the same an indication of disaccord is expressed while the apparatus is stopped. Thus, it is possible to prevent an inferior harness from being produced.

Also, it is possible to eliminate an adjustment of the cable feeding value of the cable feeder 200 and the opening and closing value of the cutter mechanism 140, to enhance a production efficiency and to prevent the production of faulty goods due to the human error in comparison with conventional adjusting work by hand, since information as to a length of the sheathed cable to be cut, a length of a sheath of the cable to be stripped and the like is inputted beforehand and the cable feeding value of the feeder 200 and the opening and closing value of the cutter mechanism 140 are automatically adjusted so that the information can be changed upon changing the cable kind.

Figure 17:
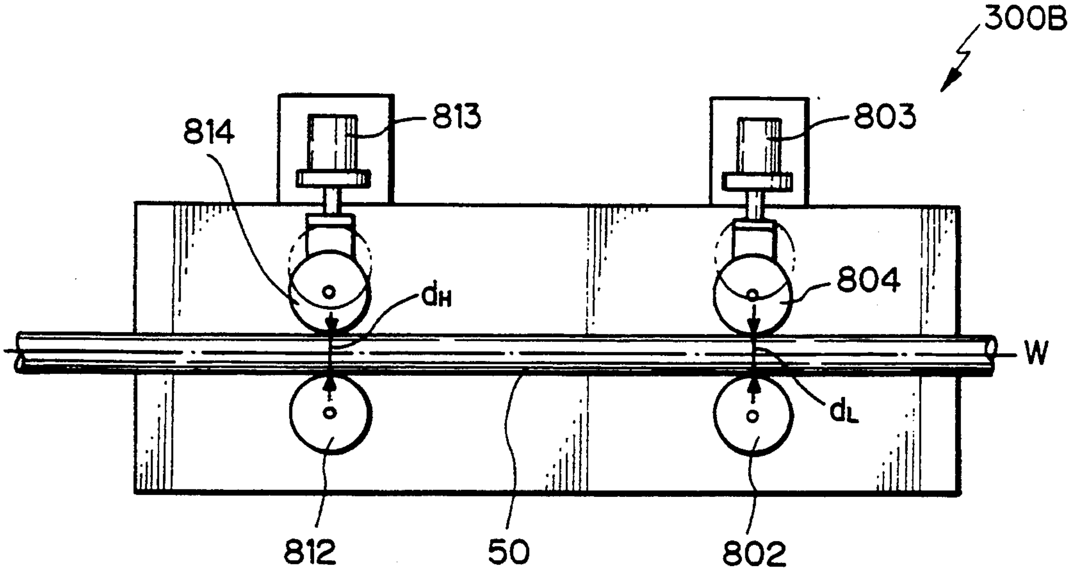
FIG. 17 is a side view of an alternation of the diameter and hardness detector shown in FIGS. 15 and 16.

Although detecting means such as the sensor 501 and the like in the detector 300B which detect a cable diameter and a sheath harness of the sheathed cable 50 are provided in the cable feeder 200 in the above embodiment, these detecting means may be provided on any position exclusive of the cable feeder 200. For example, as shown in FIG. 17, the cable diameter and sheath hardness detector 300B may be provided between the cable feeder 200 and the wire state detector 300A. That is, stationary rollers 802 and 812 and movable rollers 804 and 814 clamp the sheathed cable 50 arranged on the cable pass line W by the air cylinders 803 and 813 and a sensor (not shown) is provided so that a spaced distance between the respective stationary rollers 802, 812 and the respective movable rollers 804 and 814 is detected by the sensor upon clamping the sheathed cable. An air pressure in the air cylinder 813 is set to be higher than that in the air cylinder 803 and the cable diameter D and the sheath hardness H of the sheathed cable 50 are obtained from the following experimental equations (3) and (4).

$$D=d_H+b \quad (3)$$

$$H=(d_L-d_H)/d_L \quad (4)$$

Here, $d_L$ is a diameter of a compressed cable on a lower pressure side, $d_H$ a diameter of the compressed cable on a higher pressure side, and b a constant obtained by an experiment. Detection of the cable diameter D and sheath hardness H from the equations (3) and (4) can be carried out during feeding or stopping the sheathed cable by changing the constant b.

It is also possible to detect the spaced distances $d_L$ and $d_H$ on the lower and higher sides by using an element each of a pair of the stationary rollers 802, 812, air cylinders 803, 813, movable rollers 804, 814, sensors and the like without using two elements. That is, it is not necessary to use two air cylinders and the like if the spaced distances (diameter of the compressed cable) $d_L$ and $d_H$ in the lower and higher pressures are detected by changing an air pressure into a single air cylinder.

Figure 18:
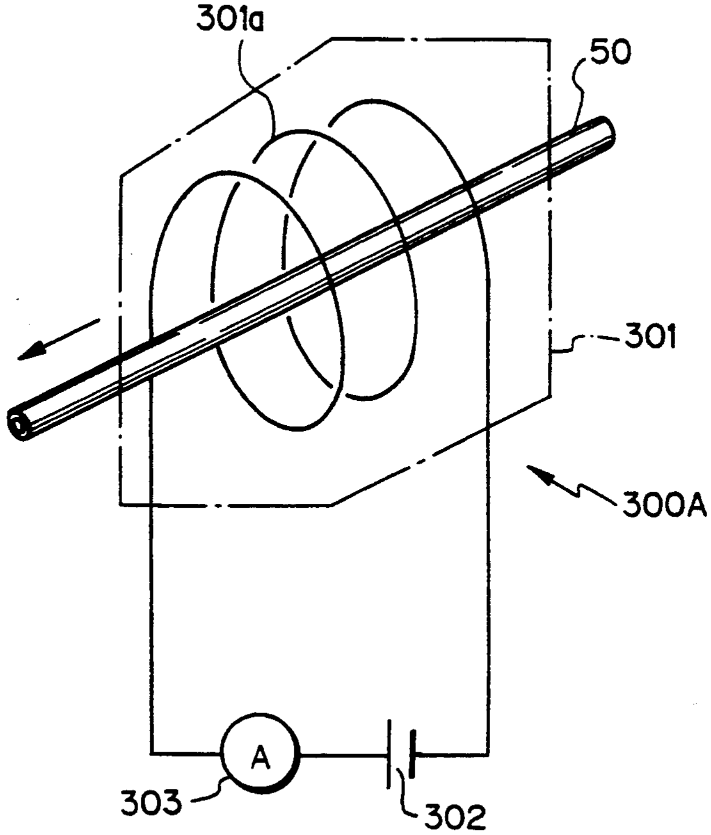
FIG. 18 is a perspective view of an alternation of the wire state detector shown in FIG. 8.
Figure 19:
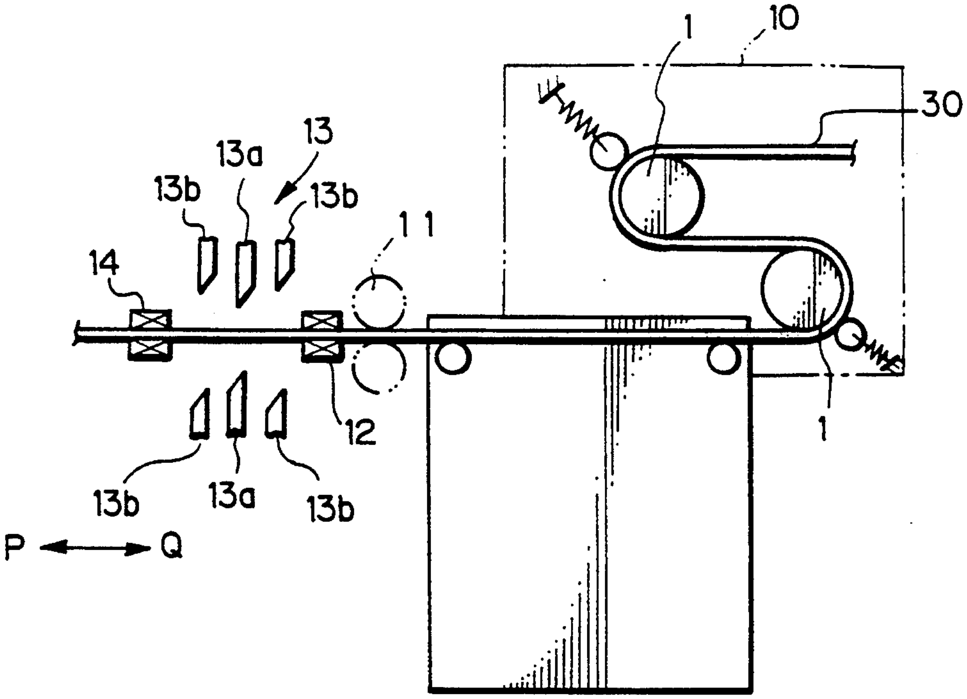
Fig. 19 PRIOR ART
FIG. 19 is a schematic side view of a prior harness producing apparatus illustrating a step of working the sheathed cable.
Figure 20:
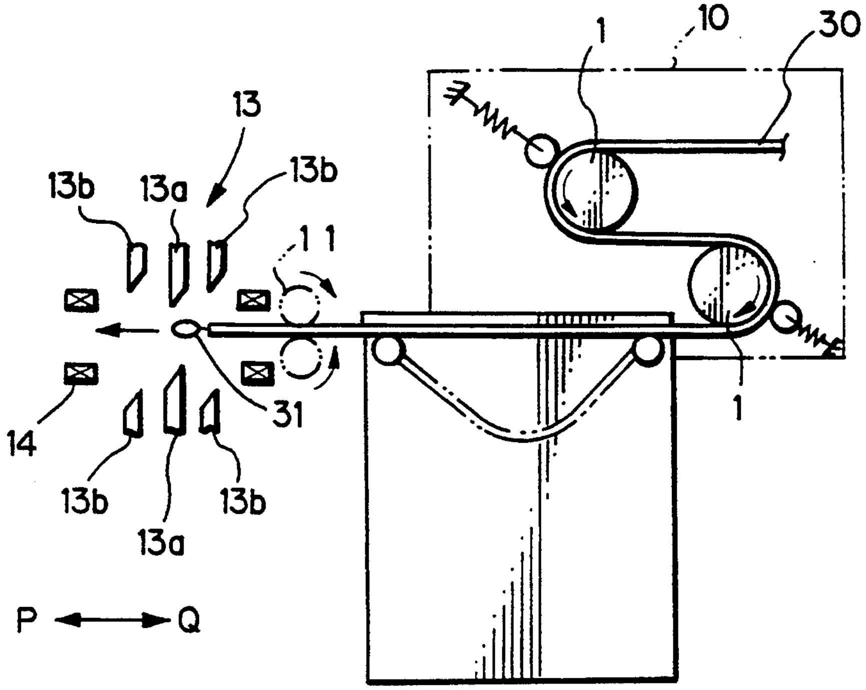
Fig. 20 PRIOR ART
FIG. 20 is a similar view of FIG. 19 but illustrating another step.

Although the wire state of the sheathed cable 50 is detected by the wire state detector 300A including the eddy current type sensor shown in FIG, 8 in the above embodiment, a wire state detector 300A shown in FIG. 18 may be used. This wire state detector 300A has a sensor head 301 with a coil 301$a$ adapted to pass the sheathed cable 50 in the same construction as that in FIG. 8. A constant magnetic field is generated in the coil 301$a$ by supplying a constant current from the electric power 302 to the coil 301$a$ and the sheathed cable 50 passes through the constant magnetic field. Then, since a reverse electromotive force is generated in the sheathed cable 50 by an electromagnetic induction upon starting and stopping of a movement of the cable and upon changing of a diameter of a cable conductor, information as to a state of the wire or wires in the various sheathed cables can be obtained by sensing a change of the reverse electromotive force by means of an ammeter 303 or a voltmeter. Thus, it is possible to detect the wire state of the sheathed cable 50 by utilizing the electromagnetic induction caused in the wire or wires of the sheathed cable 50 by an application of a given magnetic field.

Although the actual cable kind of the sheathed cable 50 to be worked is determined by detecting the cable diameter, sheath hardness and wire state of the cable 50 in the above embodiment, at least one of the cable diameter, sheath hardness, and wire state may be detected if at least one of them can determine the actual cable kind. For example, if the cable diameter is D3, the sheath hardness is H3, and the wire state is M3, the respective cable kinds of the sheathed cable are $T_{31}$, $T_{32}$ and $T_{33}$. Accordingly in this case, one of the cable diameter sheath hardness, and wire state may be detected.

It is possible to input information by using a bar code prior to start the harness producing apparatus. For example, information as to a plurality of kinds of the cable is recorded in the memory means 601 beforehand and the respective bar codes are given to the respective bar codes are given to the respective indicative cards. The bar codes are read out by a bar code reader and information as to the cable corresponding to the bar code is applied from the memory means 601 to the control means 600.

According to the harness producing apparatus of the present invention, since it is decided whether the actual sheathed cable to be worked in the apparatus is the same as the input sheathed cable or not and the indication is indicated in case of the disaccord of them, an operator can recognize his mistake of selection of a cable kind by the indication even if a sheathed cable of a mistaken cable is erroneously set in the apparatus on account of a human error and thus the cable is not worked as it is, thereby preventing a production of an inferior harness and faulty goods.

What is claimed is:

1. A harness producing apparatus which works a sheathed cable to form a harness, comprising:

means for inputting data as to cable kinds of sheathed cables to be worked;

a first means for detecting a cable diameter of an actual sheathed cable to be worked;

a second means having a sensor adapted to contact with and separate from said actual sheathed cable and for detecting a sheath hardness of said actual sheathed cable in accordance with a compressed value of a sheath of said actual sheathed cable caused upon bringing in to contact the sensor with said sheath;

a third means for detecting a wire state of said actual sheathed cable by utilizing an electromagnetic induction caused in a wire or wires by applying a given magnetic field to said actual sheathed cable;

memory means for recording information as to mutual relationships between said cable kinds and said cable diameter, sheath hardness, and wire state; and control means for determining a cable kind of said actual sheathed cable by comparing said detected cable diameter, sheath hardness and wire state and said recorded information from said memory means, for deciding whether the cables are of the same kind or not by comparing said determined actual cable kind and said input cable kind, and for generating an indicating signal when said cables are either of the same kind or not of the same kind.

* * * * *